United States Patent
Vohla et al.

(10) Patent No.: US 11,371,536 B2
(45) Date of Patent: Jun. 28, 2022

(54) DEVICE FOR CONTROLLING A PRESSING FORCE OF A CURRENT COLLECTOR HAVING A RELAY VALVE

(71) Applicant: KNORR-BREMSE SYSTEME FÜR SCHIENENFAHRZEUGE GMBH, Munich (DE)

(72) Inventors: Manfred Vohla, Vienna (AT); Kurt Haselsteiner, Möding (AT)

(73) Assignee: KNORR-BREMSE SYSTEME FÜR SCHIENENFAHRZEUGE GMBH

(*) Notice: Subject to any disclaimer, the term of this patent is extended or adjusted under 35 U.S.C. 154(b) by 157 days.

(21) Appl. No.: 16/638,666

(22) PCT Filed: Jun. 28, 2018

(86) PCT No.: PCT/EP2018/067499
§ 371 (c)(1),
(2) Date: Feb. 12, 2020

(87) PCT Pub. No.: WO2019/029902
PCT Pub. Date: Feb. 14, 2019

(65) Prior Publication Data
US 2020/0271135 A1  Aug. 27, 2020

(30) Foreign Application Priority Data
Aug. 11, 2017 (DE) .................. 10 2017 214 115.8

(51) Int. Cl.
*F15B 11/028* (2006.01)
*G05D 16/20* (2006.01)
(Continued)

(52) U.S. Cl.
CPC .............. *F15B 11/028* (2013.01); *B60L 5/32* (2013.01); *G05D 16/2013* (2013.01);
(Continued)

(58) Field of Classification Search
CPC .......... F15B 11/028; F15B 2211/6313; F15B 2211/67; G05D 16/2024; H01R 41/00; H01R 2201/36; B60L 5/32
See application file for complete search history.

(56) References Cited

U.S. PATENT DOCUMENTS 7,160,226 B2 * 1/2007 Fuller .................. B60W 30/18
477/39

FOREIGN PATENT DOCUMENTS

DE           10126042 A1   1/2002
DE      102004055030 A1   5/2006
(Continued)

OTHER PUBLICATIONS

International Search Report and Written Opinion for corresponding application PCT/EP2018/067499 dated Sep. 24, 2018.

*Primary Examiner* — Michael Leslie
*Assistant Examiner* — Daniel S Collins
(74) *Attorney, Agent, or Firm* — Barnes & Thornburg LLP

(57) ABSTRACT

A device for controlling a required pressing force from a current collector of a vehicle on an overhead line, a method for using such a device and a power car having at least one such device, utilize a pilot control circuit, a working pressure control circuit and an adjustment device including a relay valve. The pilot control circuit adjusts a pilot control pressure and the relay valve uses a pilot control pressure to control a power pressure to provide a required working pressure for the pressing force of the current collector.

16 Claims, 3 Drawing Sheets

(51) Int. Cl.
  *B60L 5/32* (2006.01)
  *H01R 41/00* (2006.01)
(52) U.S. Cl.
  CPC ......... *G05D 16/2024* (2019.01); *H01R 41/00* (2013.01); *B60L 2200/26* (2013.01); *F15B 2211/528* (2013.01); *F15B 2211/6313* (2013.01); *F15B 2211/67* (2013.01); *H01R 2201/26* (2013.01)

(56) References Cited

FOREIGN PATENT DOCUMENTS

| | | | |
|---|---|---|---|
| EP | 1539528 | A1 | 6/2005 |
| EP | 1862347 | A1 | 12/2007 |

\* cited by examiner

DEVICE FOR CONTROLLING A PRESSING FORCE OF A CURRENT COLLECTOR HAVING A RELAY VALVE

CROSS REFERENCE AND PRIORITY CLAIM

This patent application is a U.S. National Phase of International Patent Application No. PCT/EP2018/067499 filed Jul. 28, 2018, which claims priority to German Patent Application No. 10 2017 314 115.8, the disclosure of which being incorporated herein by reference in their entireties.

FIELD

Disclosed embodiments relate to a device for controlling a pressing force which is from a current collector of a vehicle (for example of a traction unit) and acts on an overhead line with a relay valve, to a method to be carried out by such a device and to a vehicle having at least one such device.

BACKGROUND

Current collectors of electric traction units require a defined pressing force acting on the overhead line. In this context, the overhead line is an overhead line of conventional design or innovative design such as, e.g., ceiling-mounted conductor rails.

If this pressing force is too small, the current collector begins to jump. The resulting interruptions in contact and arcs adversely affect the service life of the current collector contact bars and overhead lines. If this pressing force is too large, the overhead line is raised excessively. When there are unacceptable applications of force into the overhead line, the mechanical positioning of the line cannot be ensured and typical consequences of this are that the current collector can become entangled and the overhead line can be torn down.

SUMMARY

Disclosed embodiments provide a device and method which carry out more precise actuation of the required pressing forces between current collector and an overhead line which fit better with various operating situations.

Disclosed embodiments provide a device and method for performing open-loop or closed-loop control of a pressing force between an overhead line and a current collector of a vehicle.

BRIEF DESCRIPTION OF THE FIGURES

Exemplary embodiments are explained in more detail below with reference to the figures.

In the figures.

DETAILED DESCRIPTION

Figure 1:
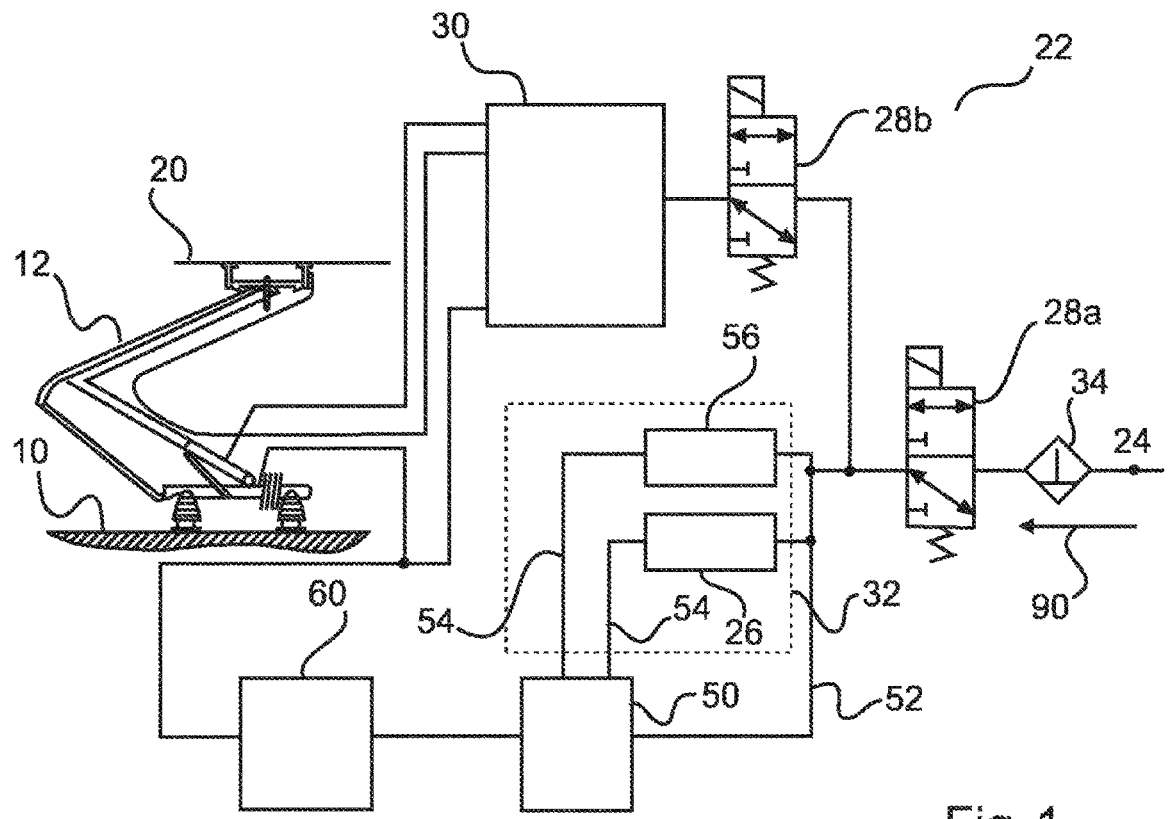
FIG. 1 shows a schematic illustration of a control device of a current collector according to exemplary embodiments.

According to DIN EN 50637:2012 the necessary pressing forces increase strongly up to approximately twice the stationary state value, in particular in the high-speed mode (>200 km/h). To ensure this increase, according to the prior art air deflectors are used in the current collector, which air deflectors, on the one hand, apply an additional force aerodynamically and, on the other hand, compensate dynamic lifting forces. It is disadvantageous here that the configurations and handling of these air deflectors cannot be easily adapted to different operating situations. For example, the additional aerodynamic force is significantly higher in high-speed tunnels than on an open stretch of track. However, this additional force is also dependent on the shape of a vehicle, tunnel cross-section, obstruction dimension (ratio of the cross-section of the vehicle to the tunnel cross-section), discontinuous increases in the cross-section and the position of the current collector in the block train. This additional force is also dependent on the direction of travel (for example depending on the crabbing or knee position of an asymmetrical single-arm current collector.

In addition, there are increasingly requirements to increase the current collector pressing force in the stationary state to avoid overheating and damage to the contact bar and overhead line wire at the contact point when there is a high current flow as result of illumination, air-condition systems and passenger information systems in vehicles which are made available. However, the air deflectors cannot apply any additional force if the traction unit is in the stationary state.

The prior art has now disclosed single-stage and two-stage (permanently set but adjustable) pressures which press the current collector against the overhead line by means of volume-variable lifting bellows. In individual cases, electropneumatic (ep) controlled pressure actuation systems as are known e.g. from EP 1 539 528 A1, are already used. It is shown therein how the fallback level which is required by railway operators when the ep regulator is faulty is provided by means of a switching valve. In the event of a fault, an ep regulator is switched over to a permanently set, adjustable pressure reducing valve. The ep regulator controls the pressing force in the normal mode of the traction unit. It is disadvantageous here that the pressing force cannot be actuated precisely enough via the regulator, therefore bringing about a high level of consumption of air.

Disclosed embodiments provide a device and method which carry out more precise actuation of the required pressing forces between current collector and an overhead line which fit better with various operating situations.

Disclosed embodiments provide a device and method for performing open-loop or closed-loop control of a pressing force between an overhead line and a current collector of a vehicle.

Disclosed embodiments provide in a device for controlling a pressing force between an overhead line and a current collector of a vehicle, which device is actuated pneumatically or hydraulically.

In this context, e.g., air or oil can be used as pressure media. During the lifting or lowering of the current collector, the pressure of the media is in equilibrium with the force of gravity (weight) of the current collector. The required pressing force is provided by increasing a working pressure which is made possible by open-loop control or closed-loop control of a power pressure by means of a pilot control pressure from a pilot control circuit. If the operating situation requires an additional pressing force, the pilot control pressure in the pilot control circuit is set to control the power pressure and to increase the working pressure.

The pilot control circuit may have a basic control circuit including a basic control device (e.g. a pressure reducing valve) for setting a first pilot control pressure (a basic pilot control pressure), an additional control circuit including an additional control device (e.g. a regulator) for setting a second pilot control pressure and a setting device including a relay valve for controlling the power pressure and for making available the working pressure. Downstream of the setting device, the working pressure is fed to the current collector, wherein further elements for influencing the pressure or volume flow can be interconnected. A working pressure control circuit is provided which determines whether the working pressure is to be fed quickly or slowly to the current collector. In addition, the working pressure control circuit can be configured in such a way that the working pressure is limited to a maximum value to avoid an excessively high pressure acting on the current collector and/or the overhead line, to prevent damage.

The relay valve is configured in such a way that one or more inputs for one or more pilot control pressures are provided with, in each case, a small cross section and an input for the power pressure and an output for the working pressure are provided with large cross sections so that a highly dynamic pilot-control pressure regulating process of usually 1:1 can be transmitted to the high-volume working pressure. In addition, in one embodiment variant a transmission ratio which is different from 1:1 can be implemented. For example, if the transmission ratio is selected to be 1:5, 10 bar act in the pilot control circuit with an output pressure of 2 bar at the output of the relay valve. In this case, a deviation is also reduced proportionately. If, for example, the deviation in the pilot control circuit is ±0.1 bar, the deviation in the output of the relay valve is only ±0.02 bar, which corresponds to an absolute reduction in the deviation, and therefore makes possible an increase in the control accuracy and a reduction in the hysteresis.

The pilot control circuit optionally has not only the regulator but also a pressure sensor and two regulating valves. The pressure sensor is provided to make available pressure signals to the regulator of the pilot control circuit. As a result of the small control volume of the pilot control circuit, the relatively high dynamics can contribute to achieving higher control accuracy. As a result of a high-resolution of the pressure sensor, a low regulating level (low pressures) of the regulator of the additional control circuit is possible and as a result a smaller tolerance (higher regulating accuracy) with a simultaneously smaller hysteresis can be implemented.

A constant control volume is continuously available to the pilot control circuit since the variable working volume is shut off from the relay valve. The regulator of the pilot control circuit can set the pressure more precisely than a direct regulator of the working pressure with variable volumes.

In one advantageous refinement of the disclosed embodiments, to monitor the regulator, inter-alia an automatic state machine is provided to monitor the working pressure to determine whether it undershoots a minimum pressure specification, exceeds a maximum pressure specification or deviates from a bandwidth between a setpoint value and an actual value. If one of these cases occurs, a rapid shut-down takes place. The rapid shut-down acts on the pilot control circuit. Depending on the design of the second pilot control pressure as an additive regulating means in addition to a basic pilot control pressure or as an absolute pilot control pressure regulating means a certain rapid shut-down working pressure can be set. In addition, the rapid shut-down can also act on the power pressure and in this way prohibit the supply of the relay valve, as result of which the working pressure is discharged in any case. This can be done by means of a main confirmation valve or by means of a piston valve which is located near to the current collector or by an emergency braking valve with an internal pressure comparison and reference pressure volume. Instead of an automatic state machine, for example an electric unit, electronic unit or microprocessor unit (if appropriate with software which is classified according to a safety level) is possible for monitoring the working pressure. Comparison signals for this monitoring device can be acquired from the pressure sensor of the additional control circuit and/or a pressure sensor which is provided for the working pressure.

Technical utility is provide in that the device is embodied in such a way that when the pressing force is unchanged there is no consumption of pressure media, which avoids a continuous consumption of media, which gives rise to a high number of compressor running cycles of the vehicle, which bring about a significant wastage of energy, generation of noise and wear at the compressor. The resulting energy efficiency ensures the energy supply of the vehicle, particularly if considerable quantities of energy are required for lighting and air-conditioning via current collectors connecting to the vehicle.

FIG. 1 shows part of a vehicle 10, a current collector 12, an overhead line 20 and a control device 22 of the current collector 12. The pressure medium air flows in the inflow direction 90 from a pressure input 24 into the control device 22 via an air filter 34. If the vehicle 10 is operating or in the stand-by mode, the control device 22 is switched on via a switching valve 28a. A switching valve 28b and a device 30 constitute monitoring devices. While the vehicle 10 is operating, a specific pressing force is required between the current collector 12 and the overhead line 20 to ensure a reliable transfer of energy from the overhead line 20 to the vehicle 10 via the current collector 12. This working pressure is obtained by means of a pilot control circuit 32 with a setting device 50 and then controlled by a working pressure regulating circuit 60.

The pilot control circuit 32 has a basic control circuit 56, an additional control circuit 26 and a setting device 50. A power pressure is fed to a first pressure medium line 52, the basic control circuit 56 and the additional control circuit 26. The basic control circuit 56 sets a first pilot control pressure (basic pilot control pressure) and the additional control circuit 26 sets a second pilot control pressure, wherein the first pilot control pressure and the second pilot control pressure are fed on to the setting device 50 via, in each case, a second pressure medium line 54, to control the power pressure of the first pressure medium line 52 therein.

Figure 2:
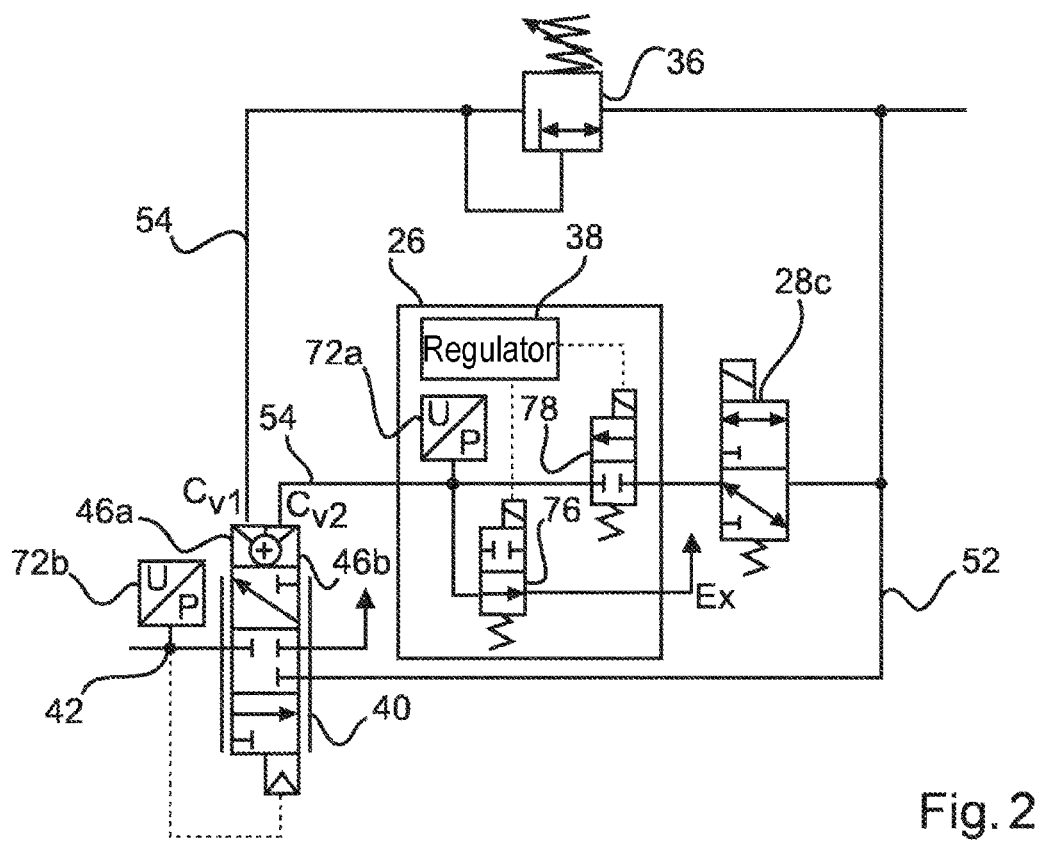
FIG. 2 shows a schematic illustration of a pilot control circuit of the control device of a current collector according to at least a first exemplary embodiment.

FIG. 2 shows a pilot control circuit 32 of the control device 22 according to a first exemplary embodiment of the invention. The pilot control circuit 32 has a pressure reducing valve 36, a switching valve 28c, an additional control circuit 26 including a regulator 38, a pressure sensor 72a, a first regulating valve 76 for reducing pressure, a second regulating valve 78 for increasing pressure, a relay valve 40 and a pressure sensor 72b.

Figure 3:
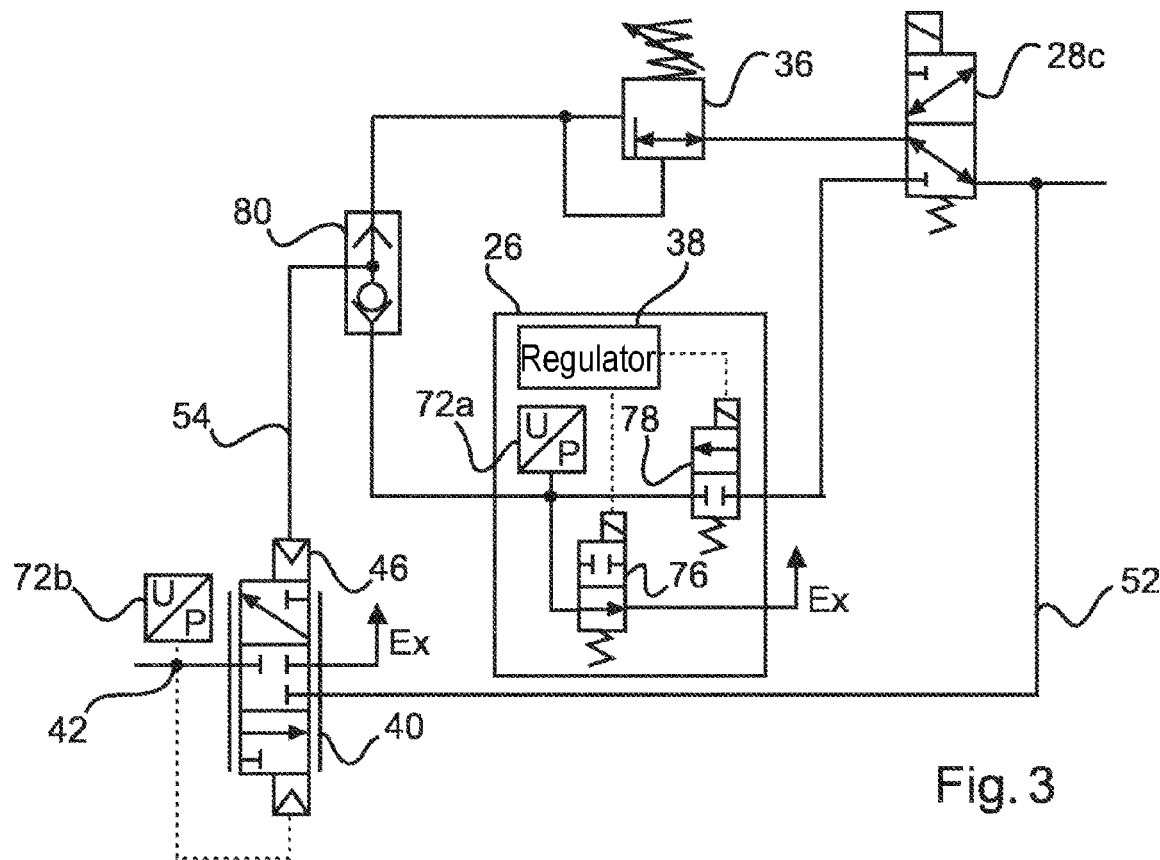
FIG. 3 shows a schematic illustration of a pilot control circuit of the control device of a current collector according to at least a second exemplary embodiment.

The pressure reducing valve 36 is configured to set the first pilot control pressure (basic pilot control pressure), and the regulator 38 is configured to set the second pilot control pressure (additional pilot control pressure), wherein the basic pilot control pressure and the additional pilot control pressure are each fed via the second pressure medium line 54 to inputs 46a and 46b of the relay valve 40. The relay valve 40 is configured in such a way that the pilot control pressures are added downstream of the inputs 46a and 46b, to control the power pressure of the first pressure medium line 52 with the added pilot control pressure and to allow the working pressure to exit from an output 42 of the relay valve 40. The switching valve 28c is provided for switching off the additional control circuit in an emergency. The pressure sensors 72a and 72b are provided for measuring the additional pilot control pressure in the additional control circuit 26 and the working pressure at the output 42 of the relay valve. FIG. 3 shows a pilot control circuit 32 of the control device 22 according to a second exemplary embodiment of the invention. In comparison to FIG. 2, the pilot control circuit 32 in FIG. 3 also has a pressure reducing valve 36, a switching valve 28c, a pilot control circuit 26 including a regulator 38, a pressure sensor 72a, a first regulating valve 76 for reducing pressure, a second regulating valve 78 for increasing pressure, a relay valve 40 and a pressure sensor 72b. The difference from FIG. 2 is that the switching valve 28c is shifted in its position and a double non-return valve 80 is additionally provided, and the relay valve 40 has just one input 46.

The switching valve 28c is shifted in FIG. 3 to a position at which switching between the first pilot control pressure and the second pilot control pressure can be carried out. The double non-return valve 80 is provided for carrying out a pressure comparison between the pilot control pressures and to let through the respectively higher pressure to the input 46 of the relay valve 40.

Figure 4:
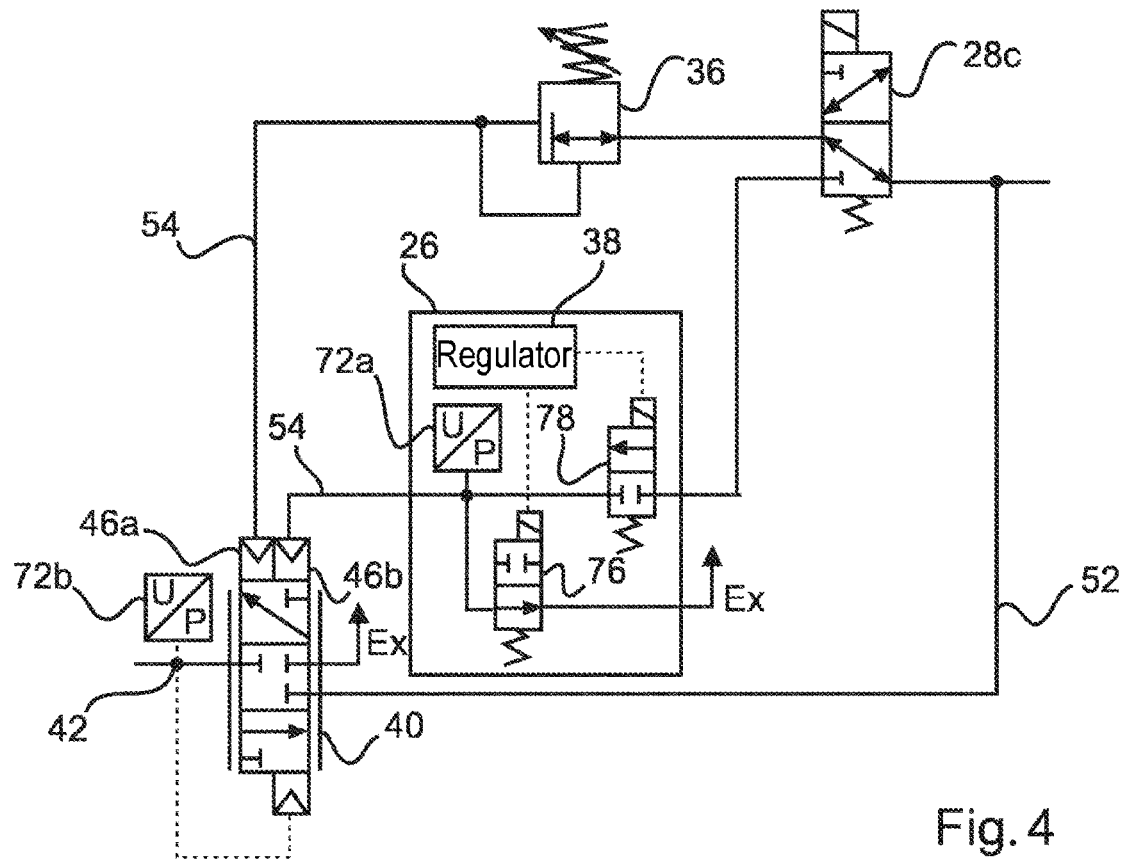
FIG. 4 shows a schematic illustration of a pilot control circuit of the control device of a current collector according to at least a third exemplary embodiment.

FIG. 4 shows a pilot control circuit 32 of the control device 22 according to a third exemplary embodiment of the invention. In comparison with FIG. 3, the pilot control circuit 32 also has a pressure reducing valve 36, a switching valve 28c, an additional control circuit 26 including a regulator 38, a pressure sensor 72a, a first regulating valve 76 for reducing pressure, a second regulating valve 78 for increasing pressure, a relay valve 40 and a pressure sensor 72b. The difference from FIG. 3 is that the double non-return valve 80 in the pilot control circuit 32 is absent and the relay valve 40 is provided with two inputs 46a and 46b. The pressure comparison which is analogous to FIG. 3 is integrated into the inputs 46a, 46b of the relay valve 40 so that just the respectively higher pressure of the first pilot control pressure (basic control pressure) and the second pilot control pressure (if appropriate including the basic pilot control pressure) acts to control the power pressure.

Figure 5:
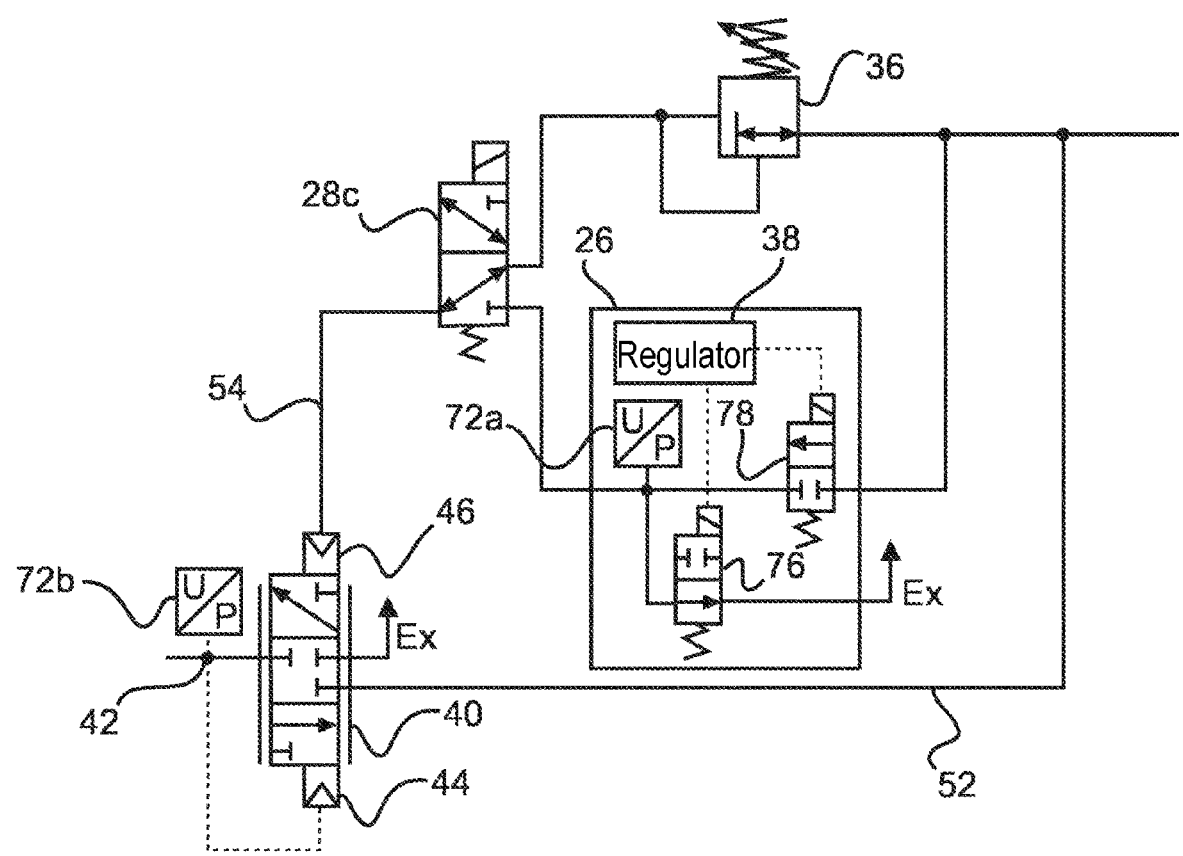
FIG. 5 shows a schematic illustration of a pilot control circuit of the control device of a current collector according to at least a fourth exemplary embodiment.

FIG. 5 shows a pilot control circuit 32 of the control device 22 according to a fourth exemplary embodiment of the invention. In comparison with FIG. 4, the pilot control circuit 32 also has a pressure reducing valve 36, a switching valve 28c, an additional control circuit 26 including a regulator 38, a pressure sensor 72a, a first regulating valve 76, a second regulating valve 78, a relay valve 40 and a pressure sensor 72b. The difference from FIG. 4 is that the switching valve 28c is shifted in its position within the pilot control circuit 32 and the relay valve 40 has just one input 46. The switching valve 28c is shifted to there to carry out switching between the first and the second pilot control pressures, and to let through just one pressure thereof on to the relay valve to control the power pressure.

LIST OF REFERENCE SIGNS

10 Vehicle
12 Current collector
20 Overhead line
22 Control device
24 Pressure input
26 Additional control circuit
28a, 28b, 28c Switching valve
30 Device
32 Pilot control circuit
34 Air filter
36 Pressure reducing valve
38 Regulator
40 Relay valve
42 Output of a relay valve
46, 46a, 46b Input of a relay valve
50 Setting device
52 First pressure medium line
54 Second pressure medium line
56 Basic control circuit
60 Working pressure control circuit
72a, 72b Pressure sensor
76 First regulating valve
78 Second regulating valve
80 Double non-return valve
90 Direction arrow

The invention claimed is:

1. A device for controlling a pressing force which is from a current collector of a vehicle and acts on an overhead line, wherein the pressing force is actuated by a pneumatic or hydraulic working pressure, the device comprising:
   a pilot control circuit;
   a working pressure control circuit;
   a relay valve which is configured to control, in accordance with a pilot control pressure, a power pressure which has been made available and to output the power pressure as a working pressure into the working pressure control circuit,
   wherein the relay valve has at least one input for the pilot control pressure with a small cross-section and one input for the power pressure and one output for the working pressure with large cross-sections so that a transmission ratio is provided,
   wherein at least two inputs are provided on the pilot control pressure side on the relay valve, and the relay valve is configured such that a plurality of pilot control pressures are added at the inputs to control the power pressure.

2. The device of claim 1, wherein the transmission ratio of the relay valve is provided with a transmission ratio other than 1:1, wherein a step-up or step-down transmission ratio is selected.

3. The device of claim 1, further comprising a basic control circuit including a basic control device formed by a pressure reducing valve for setting a first pilot control pressure.

4. The device of claim 3, further comprising an additional control device of the additional control circuit formed by a regulator for setting a second pilot control pressure.

5. The device of claim 1, further comprising a switching valve provided as a switch-on and switch-off valve in the power pressure circuit upstream of an introduction point for the power pressure into the pilot control circuit and the working pressure control circuit.

6. The device of claim 4, further comprising a switching valve provided in the pilot control circuit upstream of the branch into the basic control circuit and the additional control circuit.

7. The device of claim 6 wherein the basic control circuit and the additional control circuit are connected to a double non-return valve which is configured such that the respectively higher pressure is connected through and is fed to the relay valve.

8. The device of claim 4, wherein a switching valve is provided in the pilot control circuit downstream of the basic control circuit and the additional control circuit and is configured in such a way that just one pressure of the pilot control pressures is connected through and fed to the relay valve.

9. The device of claim 4, wherein the additional control device is configured such that the second pilot control pressure already also contains a basic pilot control pressure.

10. The device of claim 1, wherein an automatic state machine is provided for monitoring the working pressure, which machine is configured such that the machine switches off the regulated pilot control pressures in defined situations.

11. The device of claim 1, further comprising an electric unit, electronic unit or microprocessor unit provided for monitoring the working pressure, which unit is configured such that unit switches off the regulated pilot control pressures in defined situations.

12. The device of claim 4, wherein the additional control circuit has a regulator, a pressure sensor and two regulating valves with which the first pilot control pressure can be calibrated in both directions.

13. A method for controlling a pressing force which is from a current collector of a vehicle and acts on an overhead line, wherein the pressing force is actuated by a pneumatic or hydraulic power pressure, wherein the power pressure is regulated by a pilot control pressure from a pilot control circuit, the method comprising:
    fixed or regulated setting of a pilot control pressure in the pilot control circuit to set the pressing force; and
    setting the power pressure by the pilot control pressure in accordance with the transmission ratio,
    wherein at least two inputs are provided on the pilot control pressure side on a relay valve and the relay valve is configured such that a plurality of pilot control pressures are added at the inputs to control the power pressure.

14. A method for controlling a pressing force which is from a current collector of a vehicle and acts on an overhead line, wherein the pressing force is actuated by a pneumatic or hydraulic power pressure, wherein the power pressure is regulated by pilot control pressures from a pilot control circuit, the method comprising:
    setting a first pilot control pressure in the pilot control circuit to set the normal pressing force;
    setting a second pilot control pressure in the pilot control circuit to set an additional pressing force;
    adding the pilot control pressures in accordance with the respective driving situation; and
    setting the power pressure using the pilot control pressures and the transmission ratio.

15. A method for controlling a pressing force which is from a current collector of a vehicle and acts on an overhead line, wherein the pressing force is actuated by a pneumatic or hydraulic power pressure, wherein the power pressure is regulated by pilot control pressures from a pilot control circuit, the method comprising:
    setting a first pilot control pressure in the pilot control circuit to set the normal pressing force;
    setting a second pilot control pressure in the pilot control circuit to set a pressing force which is composed of the normal pressing force and an additional pressing force;
    selecting whether the working pressure is to be regulated by the first pilot control pressure or the second pilot control pressure in accordance with the respective driving situation; and
    setting the working pressure by the selected pilot control pressure and the transmission ratio.

16. A vehicle having at least one device as claimed in claim 1.

* * * * *